US012734620B2

(12) United States Patent
Tsukimoto et al.

(10) Patent No.: US 12,734,620 B2
(45) Date of Patent: Sep. 15, 2026

(54) KITCHEN KNIFE AND METHOD FOR MANUFACTURING KITCHEN KNIFE

(71) Applicant: KAI R&D CENTER CO., LTD., Seki (JP)

(72) Inventors: Hironobu Tsukimoto, Seki (JP); Junji Mishina, Seki (JP); Toshiya Nakamura, Seki (JP); Koichi Momose, Seki (JP)

(73) Assignee: KAI R&D CENTER CO., LTD., Seki (JP)

( * ) Notice: Subject to any disclaimer, the term of this patent is extended or adjusted under 35 U.S.C. 154(b) by 68 days.

(21) Appl. No.: 18/432,790

(22) Filed: Feb. 5, 2024

(65) Prior Publication Data

US 2024/0173878 A1 May 30, 2024

Related U.S. Application Data

(63) Continuation of application No. PCT/JP2023/002972, filed on Jan. 31, 2023.

(30) Foreign Application Priority Data

Mar. 2, 2022 (JP) ................................ 2022-031733

(51) Int. Cl.
*B23P 15/28* (2006.01)
*B26B 9/00* (2006.01)
*B26B 9/02* (2006.01)

(52) U.S. Cl.
CPC ................ *B23P 15/28* (2013.01); *B26B 9/00* (2013.01); *B26B 9/02* (2013.01)

(58) Field of Classification Search
CPC .... B26B 3/00; B26B 3/02; B26B 9/00; B26B 9/02; B21K 11/02; B23P 15/28; B23P 15/40; B23P 15/403
(Continued)

(56) References Cited

U.S. PATENT DOCUMENTS 386,183 A * 7/1888 Brooks ..................... B26B 9/02 30/355
486,426 A * 11/1892 Brooks ..................... B26B 9/00 30/355
(Continued)

FOREIGN PATENT DOCUMENTS

CN 109049010 A * 12/2018 .............. B23P 15/28
CN 110303525 A * 10/2019 .............. B26B 9/02
(Continued)

OTHER PUBLICATIONS

International Search Report for PCT/JP2023/002972, mailed on Mar. 20, 2023, 2 pages.

*Primary Examiner* — Jason Daniel Prone
(74) *Attorney, Agent, or Firm* — Sterne, Kessler, Goldstein & Fox P.L.L.C.

(57) ABSTRACT

A kitchen knife includes a spine-side member located on a spine side; and a blade-side member located on a blade side and composed of a stacked member including a stack of two or more different metallic materials. The blade-side member is thinner than the spine-side member, and a pattern is formed on the blade-side member by processing the blade-side member into a curved shape at least at a part thereof as viewed from a cutting edge side, then joining the blade-side member to the spine-side member, and performing at least one of grinding and polishing after the joining.

4 Claims, 7 Drawing Sheets

(58) Field of Classification Search
USPC ......... 30/355–357; D7/649; 76/101.1, 104.1, 76/118, 119, DIG. 8
See application file for complete search history.

(56) References Cited

U.S. PATENT DOCUMENTS

| | | | | | |
|---|---|---|---|---|---|
| 592,961 | A * | 11/1897 | Brooks | B26B 9/02 | 30/355 |
| 615,518 | A * | 12/1898 | Baker et al. | B26B 9/00 | 76/118 |
| 1,266,672 | A * | 5/1918 | Forster | B26B 3/00 | 30/355 |
| 1,793,171 | A * | 2/1931 | Grant | B26B 9/02 | 30/355 |
| 2,279,833 | A * | 4/1942 | Madan | B26B 9/00 | D7/649 |
| 2,315,898 | A * | 4/1943 | Krilow | B26B 9/02 | 30/355 |
| 2,319,607 | A * | 5/1943 | Kevorkian et al. | B26B 9/02 | 30/357 |
| 2,537,555 | A * | 1/1951 | Sloan | B26B 9/02 | 30/355 |
| 2,760,266 | A * | 8/1956 | Sanders | B26B 9/02 | 76/104.1 |
| 2,803,876 | A * | 8/1957 | Nelson | B26B 9/00 | 30/357 |
| 3,035,344 | A * | 5/1962 | Brown | B26B 9/02 | 30/115 |
| 4,399,611 | A | 8/1983 | Maringer | | |
| 4,896,424 | A * | 1/1990 | Walker | B26B 9/00 | 76/104.1 |
| 5,241,883 | A * | 9/1993 | Coppier | B26B 9/00 | 76/104.1 |
| 5,256,496 | A * | 10/1993 | Kluczynski | B26B 9/00 | 30/350 |
| 5,592,742 | A * | 1/1997 | Okamura | B26B 9/00 | 30/353 |
| 5,787,591 | A * | 8/1998 | Lu | B26B 9/02 | 30/356 |
| 6,108,915 | A * | 8/2000 | Verdier | B26B 9/02 | 30/357 |
| 8,186,561 | B2 * | 5/2012 | Allen | B23P 15/40 | 30/147 |
| D678,734 | S * | 3/2013 | Harris | D7/649 | |
| D689,330 | S * | 9/2013 | Lucas | D7/649 | |
| D690,562 | S * | 10/2013 | Hasegawa | D7/649 | |
| D821,160 | S * | 6/2018 | Menhennett | D7/649 | |
| D920,056 | S * | 5/2021 | Chen | D7/649 | |
| D1,015,824 | S * | 2/2024 | Schmidt | B26B 9/00 | D7/649 |
| D1,016,577 | S * | 3/2024 | Schmidt | D7/649 | |
| 12,064,837 | B2 * | 8/2024 | Cho | B23P 15/40 | |
| D1,109,573 | S * | 1/2026 | Otsuka | D7/649 | |
| 2003/0084577 | A1 * | 5/2003 | Kaizuka | B26B 9/00 | 30/350 |
| 2006/0101649 | A1 * | 5/2006 | Chen | B26B 9/00 | 30/349 |
| 2007/0000135 | A1 * | 1/2007 | Chen | B26B 3/00 | 30/142 |
| 2007/0015445 | A1 * | 1/2007 | Harden | B26B 9/00 | 451/45 |
| 2008/0250656 | A1 * | 10/2008 | Lewis | B23P 15/28 | 30/356 |
| 2010/0251554 | A1 * | 10/2010 | Chien | B26B 9/00 | 30/346 |
| 2013/0008035 | A1 * | 1/2013 | Hsiung | B26B 9/00 | 30/350 |
| 2014/0157606 | A1 * | 6/2014 | Owens | B26B 9/00 | 30/345 |
| 2017/0265488 | A1 * | 9/2017 | Washington | B26B 9/00 | |
| 2018/0029241 | A1 * | 2/2018 | Kim | B26B 9/00 | |
| 2019/0160697 | A1 * | 5/2019 | Henry | B26B 9/00 | |
| 2019/0210096 | A1 * | 7/2019 | Dovel | B21K 11/02 | |
| 2022/0088806 | A1 * | 3/2022 | Katsu | B26B 9/00 | |
| 2023/0050474 | A1 * | 2/2023 | Schmidt | B26B 9/00 | |
| 2023/0139730 | A1 * | 5/2023 | Ward | B26B 9/02 | 83/697 |
| 2023/0141426 | A1 * | 5/2023 | Nishihara | B26B 9/02 | 30/346 |
| 2023/0330800 | A1 * | 10/2023 | Zheng | B23P 15/28 | |
| 2023/0381985 | A1 * | 11/2023 | Albert | B26B 9/00 | |

FOREIGN PATENT DOCUMENTS

| | | | | | |
|---|---|---|---|---|---|
| CN | 111203919 | A * | 5/2020 | B23P 15/28 |
| CN | 111331963 | A * | 6/2020 | B23P 15/28 |
| CN | 113305523 | A * | 8/2021 | B23P 15/28 |
| DE | 202025100250 | U1 * | 1/2025 | B26B 9/02 |
| JP | H08155153 | A | 6/1996 | |
| JP | 2011161064 | A | 8/2011 | |
| JP | 6377788 | B1 | 8/2018 | |
| JP | 2018143309 | A | 9/2018 | |
| JP | 2019098109 | A | 6/2019 | |
| JP | 2023129272 | A * | 9/2023 | B26B 9/00 |
| KR | 20120030902 | A * | 3/2012 | B26B 9/00 |
| KR | 102261307 | B1 * | 6/2021 | B26B 9/02 |
| KR | 20210137654 | A | 11/2021 | |
| KR | 20250081211 | A * | 6/2025 | B26B 3/02 |
| WO | 2019111666 | A1 | 6/2019 | |
| WO | WO-2024236692 | A1 * | 11/2024 | B26B 9/00 |
| WO | WO-2025094458 | A1 * | 5/2025 | B26B 3/00 |
| WO | WO-2025107671 | A1 * | 5/2025 | B23P 15/28 |

* cited by examiner

KITCHEN KNIFE AND METHOD FOR MANUFACTURING KITCHEN KNIFE

CROSS-REFERENCE TO RELATED APPLICATIONS

This application is a continuation of International Application No. PCT/JP2023/002972, filed Jan. 31, 2023, which claims priority to Japanese Application No. 2022-031733, filed Mar. 2, 2022.

TECHNICAL FIELD

One aspect of the present disclosure relates to a kitchen knife.

BACKGROUND ART

There has been a conventional kitchen knife in which the kitchen knife using a raw material including a stack of several types of metallic plate materials is curved, and is then subjected to grinding and polishing, etc., thereby forming a pattern on a blade. Such a conventional kitchen knife is disclosed in Patent Document 1, for example.

CITATION LIST

Patent Document

Patent Document 1: Japanese Patent Publication No. 6377788

SUMMARY

Technical Problem

However, as the above-described conventional kitchen knife uses the raw material including the stack of the several types of metallic plate materials, the raw material involves higher cost than in a case of a kitchen knife using a single metallic plate material as a raw material. This causes a problem such as increase in manufacturing cost for the kitchen knife.

Solution to Problem

To solve the foregoing problem, the present disclosure provides the following means.

A kitchen knife according to one aspect of the present disclosure comprises:

a spine-side member located on a spine side; and a blade-side member located on a blade side and composed of a stacked member including a stack of two or more different metallic materials, wherein a pattern is formed on the blade-side member by processing the blade-side member into a curved shape at least at a part of the stacked member thinner than the spine-side member as viewed from a cutting edge side, then joining the blade-side member to the spine-side member, and performing at least one of grinding and polishing after the joining.

The above-described kitchen knife can be configured in such a manner that the stacked member is used for the blade-side member, a material different from the stacked member is used for the spine-side member, and the pattern is formed on a part corresponding to the blade-side member using the stacked member. In this kitchen knife, as a material in a single layer of lower unit price than the stacked member can be used for the spine-side member, material cost is reduced. This allows the kitchen knife to be manufactured at lower cost than a kitchen knife entirely composed of a stacked member.

The blade-side member and the spine-side member can be formed using different materials. This allows use of a material to provide excellent cutting ability for the blade-side member and use of a material resistant to damage for the spine-side member, for example, so that materials suitable for respective purposes can be selected.

Different metallic materials appear at the cutting edge of the blade-side member. Thus, if metallic materials of different wear properties are used, a saw-like shape is formed at the cutting edge as a result of wear, making it possible to achieve sharper cutting ability.

Preferably, in the above-described kitchen knife, the blade-side member is processed into an undulating shape as viewed from the cutting edge side.

According to the above-described kitchen knife, it is possible to form a wavy pattern with an excellent appearance on the blade-side member by grinding or polishing, for example.

Preferably, in the above-described kitchen knife, the different metallic materials of the blade-side member are exposed on at least one of a front surface and a back surface of the blade-side member by performing at least one of grinding and polishing to form the pattern on the blade-side member.

The kitchen knife of the above-described configuration can be a kitchen knife with a pattern composed of different metallic materials exposed on both or one of a front surface and a back surface thereof.

Preferably, in the above-described kitchen knife, while the blade-side member is processed into the curved shape, the thickness of the blade-side member viewed from the cutting edge side is substantially equal to that of the spine-side member.

According to the kitchen knife of the above-described configuration, in joining between the blade-side member and the spine-side member, it is possible to align their respective center lines by laying the blade-side member and the spine-side member on a flat table. This allows the blade-side member and the spine-side member to be joined to each other while preventing misalignment without using a dedicated jig, etc. during the joining.

Preferably, in the above-described kitchen knife, the blade-side member and the spine-side member are joined to each other in such a manner that a center line of the blade-side member in a thickness direction substantially overlaps a center line of the spine-side member in a thickness direction.

The kitchen knife of the above-described configuration achieves joining between the spine-side member and the blade-side member while minimizing misalignment therebetween.

Preferably, in the above-described kitchen knife, the center line of the blade-side member in the thickness direction is a line passing through a center between a line connecting vertexes at a front surface and a line connecting vertexes at a back surface of the blade-side member as viewed from the cutting edge side.

Preferably, in the above-described kitchen knife, etching process is performed on the blade-side member.

According to the kitchen knife of the above-described configuration, by taking advantage of properties responsive to chemical changes of the different metallic materials forming the blade-side member, it becomes possible to form a more aesthetic pattern clearly.

A method of manufacturing a kitchen knife according to one aspect of the present disclosure comprises:

a curving process step of processing a blade-side member composed of a stacked member including a stack of two or more different metallic materials in such a manner as to curve the blade-side member at least at a part thereof as viewed from a direction where a cutting edge is to be formed;

a joining process step of joining the blade-side member and a spine-side member to each other; and a grinding and polishing process step of performing at least one of grinding and polishing on the joined blade-side member and spine-side member to form a pattern.

By manufacturing the kitchen knife with the pattern formed through these steps, it becomes possible to manufacture a kitchen knife with a pattern at relatively low cost.

DESCRIPTION OF EMBODIMENTS

Figure 1:
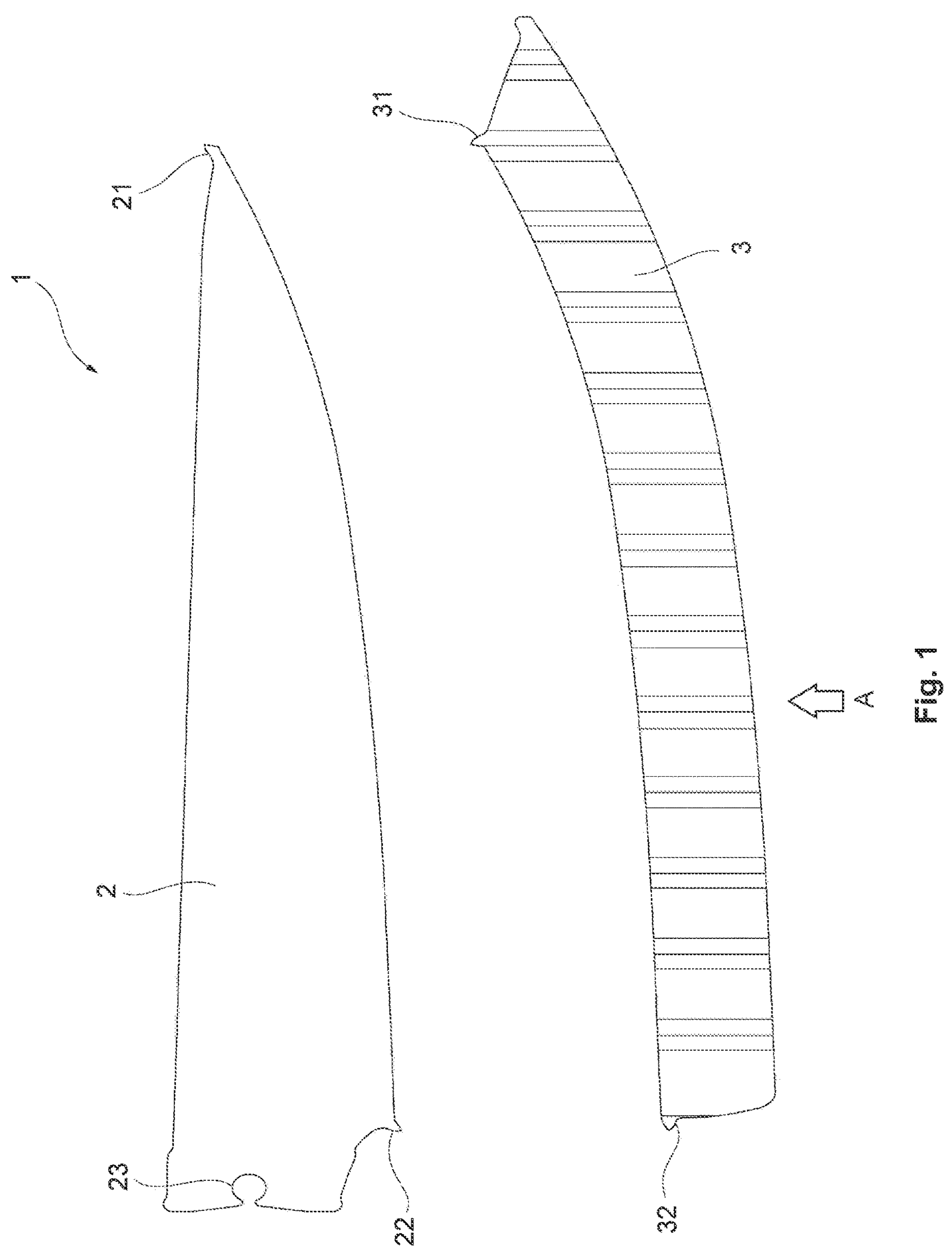
FIG. 1 is a plan view of a kitchen knife before joining.

A kitchen knife according to an embodiment of the present disclosure is a kitchen knife having a pattern formed on a blade-side member, and manufactured by joining the blade-side member composed of a stacked member including a stack of a plurality of metallic materials and a spine-side member made of a single material to each other, and then performing grinding and polishing.

The kitchen knife according to one embodiment of the present disclosure will be described below in detail by referring to the drawings. The embodiment and examples below are described merely as examples of the present disclosure and are not intended to limit the interpretation of the technical scope of the present disclosure. Constituting elements common to each drawing are given the same sign.

FIG. 1 is a plan view of a kitchen knife 1 before a spine-side member 2 and a blade-side member 3 are joined to each other.

The spine-side member 2 is made of metal in a single layer having a shape like a flat plate and is located on the spine side in a state of being joined to the blade-side member 3. The spine-side member 2 is made of SUS420J2 as martensite-based stainless steel, for example. In a plan view, the spine-side member 2 has a linear shape along its spine-side edge and is curved along its blade-side edge to be joined to the blade-side member 3. The spine-side member 2 has a protrusion 21 and a protrusion 22 used for positioning during joining to the blade-side member 3. The protrusion 21 is provided at a tip of the spine-side member 2 on the spine side. The protrusion 22 is provided at a rear end of the spine-side member 2 on the blade side. The spine-side member 2 has a hole part 23 provided at the rear end for attachment of a handle not shown in the drawings. The spine-side member 2 is made of a metallic material having a thickness of 2.5 mm, for example.

The blade-side member 3 is composed of a stacked member including a stack of two or more different metallic materials and is located on the blade side in a state of being joined to the spine-side member 2. As an example, a material prepared by stacking different alloys into layers of a number equal to or greater than 10 and equal to or less than 100 is used as the stacked member of the blade-side member 3. More specifically, the stacked member to be used can be metal prepared by alternately stacking metal containing iron (Fe) as a basis and additionally, 0.65% of carbon (C), 14.00% of chromium (Cr), and 0.15% of molybdenum, and metal containing iron (Fe) as a basis and additionally, 1.00% of carbon (C), 15.00% of chromium (Cr), 1.00% of molybdenum, 0.25% of vanadium (V), and 1.55% of cobalt (Co). Meanwhile, the stacked member of the blade-side member 3 is arbitrarily selectable.

The blade-side member 3 has a shape like a flat plate in a state before implementation of a curving step. The blade-side member 3 is curved along its spine-side edge to be joined to the spine-side member 2 into the same shape as the facing edge of the spine-side member 2. The blade-side member 3 has a protrusion 31 and a protrusion 32 formed at positions facing the protrusions 21 and 22 of the spine-side member 2 respectively and used for positioning during joining therebetween. The protrusion 31 is provided at a tip of the blade-side member 3 on the spine side. The protrusion 32 is provided at a rear end of the blade-side member 3 on the spine side. In a state having a shape like a flat plate before processing, the blade-side member 3 has a thickness of 2.2 mm, for example. The thickness of the blade-side member 3 before curving process is less than that of the spine-side member 2.

Figure 7:
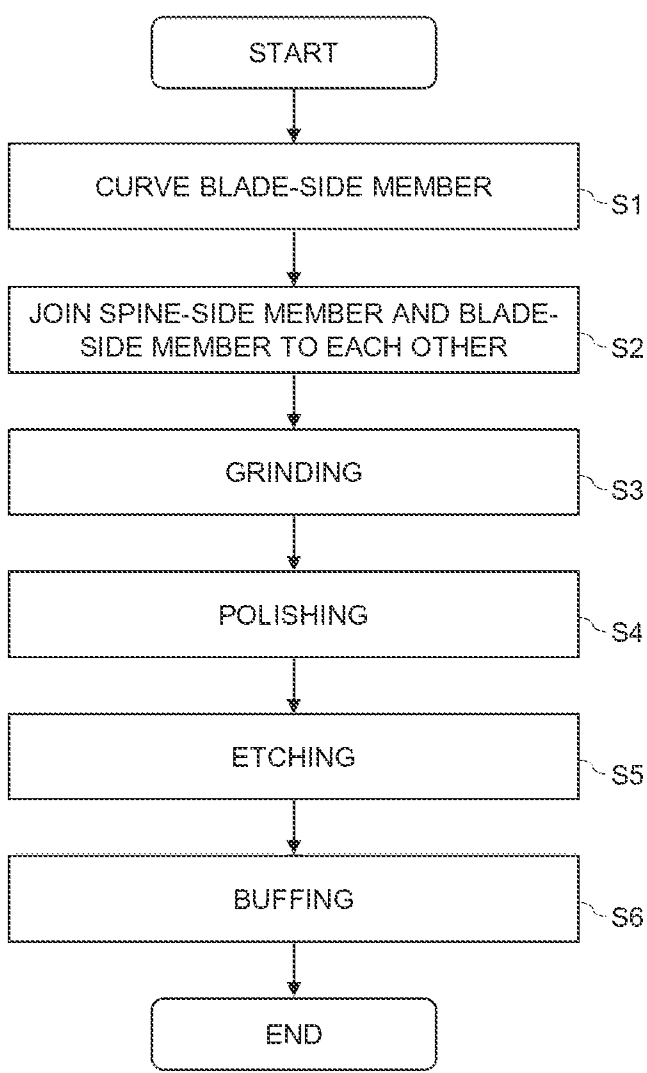
FIG. 7 is a flowchart showing steps of manufacturing the kitchen knife.

The spine-side member 2 and the blade-side member 3 described above are processed into the kitchen knife 1 through manufacturing steps described in detail below. As shown in FIG. 7, the steps of manufacturing the kitchen knife 1 comprise a curving process step S1 of curving the blade-side member 3, a joining process step S2 of joining the spine-side member 2 and the blade-side member 3 to each other, and a grinding step S3 of performing grinding, a polishing step S4 of performing polishing, an etching step S5 of performing etching, and a buffing step S6 of performing buffing on the joined spine-side member 2 and blade-side member 3.

Figure 3:
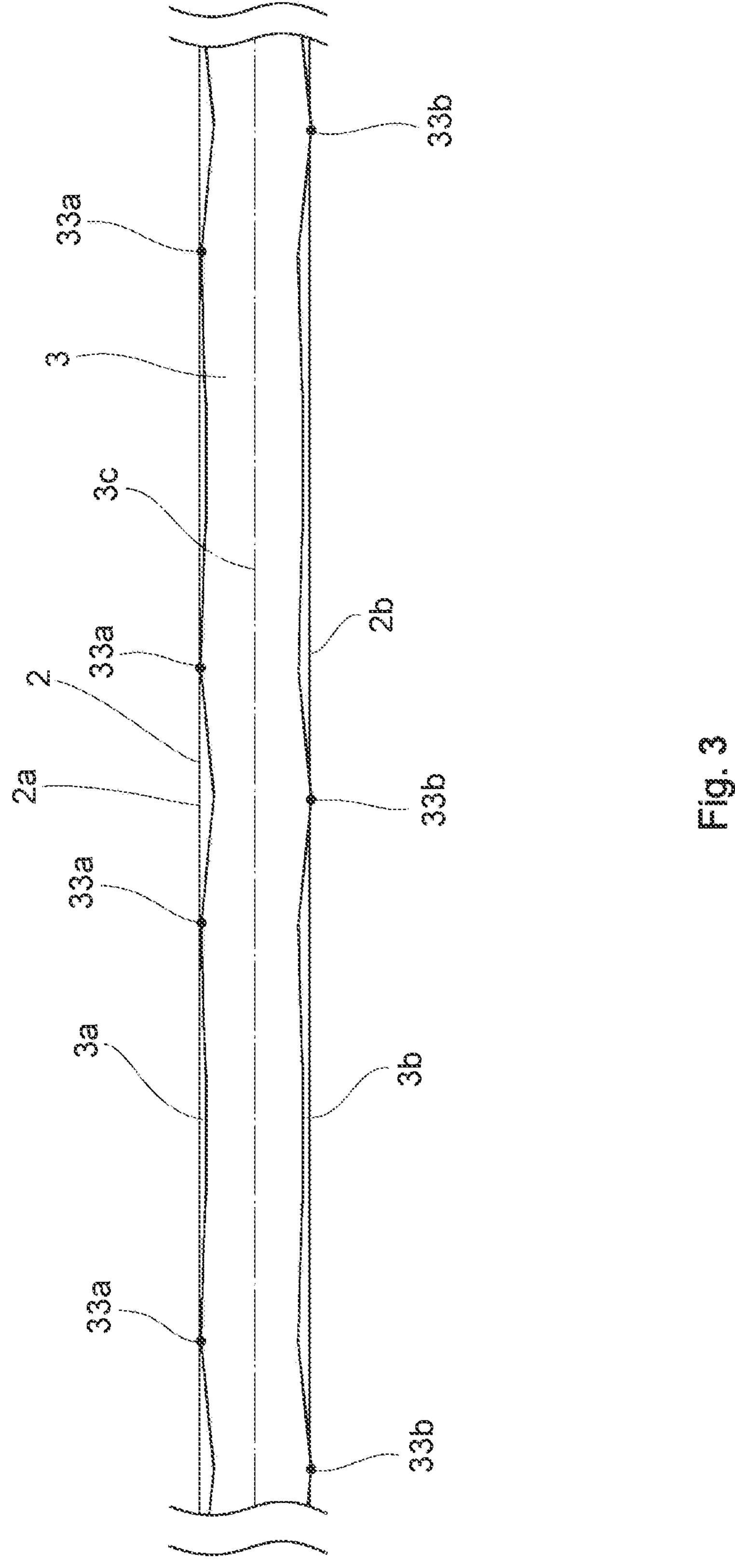
FIG. 3 is a view of the kitchen knife after the joining and before the grinding taken from a cutting edge side.

The blade-side member 3 has a shape like a flat plate before processing, as described above. After implementation of the curving process step S1 of performing curving process to process the blade-side member 3 into an undulating shape as viewed from a cutting edge side, the blade-side member 3 is given a shape shown in FIGS. 1 and 3. FIG. 3 shows a state viewed from the cutting edge side indicated by an arrow A in FIG. 1 where the blade-side member 3 and the spine-side member 2 are joined to each other. In FIG. 3, the spine-side member 2 has a front surface 2*a* and a back surface 2*b*. While a way in which the blade-side member 3 is curved is arbitrarily settable, the blade-side member 3 is curved to an extent at which a pattern is formed on at least one of a front surface and a back surface of the blade-side member 3 in a finished state as the kitchen knife 1. As shown in FIG. 3, the blade-side member 3 of the present embodiment has a configuration with the undulating shape repeatedly appearing periodically as viewed from the cutting edge side. As a result of this configuration with the undulating shape repeatedly appearing periodically as viewed from the cutting edge side, the finished kitchen knife 1 is given a periodic undulating pattern with an excellent aesthetic appearance.

The blade-side member 3 subjected to the curving process has a thickness of 2.5 mm, which is the same as that of the spine-side member 2 in order to prevent misalignment from the spine-side member 2 and to join the blade-side member 3 to the spine-side member 2 along their respective center lines. As shown in FIG. 3, the thickness of the blade-side member 3 subjected to the curving process means a distance between a line connecting a plurality of vertexes 33*a* at the front surface 3*a* and a line connecting a plurality of vertexes 33*b* at the back surface 3*b* of the blade-side member 3. In the present description, a straight line passing through a center between the line connecting the plurality of vertexes 33*a* at the front surface 3*a* and the line connecting the plurality of vertexes 33*b* at the back surface 3*b* of the blade-side member 3 is called a center line 3*c* of the blade-side member 3 subjected to the curving process.

Various methods can be used for the curving process on the blade-side member 3. As an example, the curving process can be performed by a method of performing pressing on the blade-side member 3 several times. The curving process on the blade-side member 3 can be performed by other methods.

Figure 2:
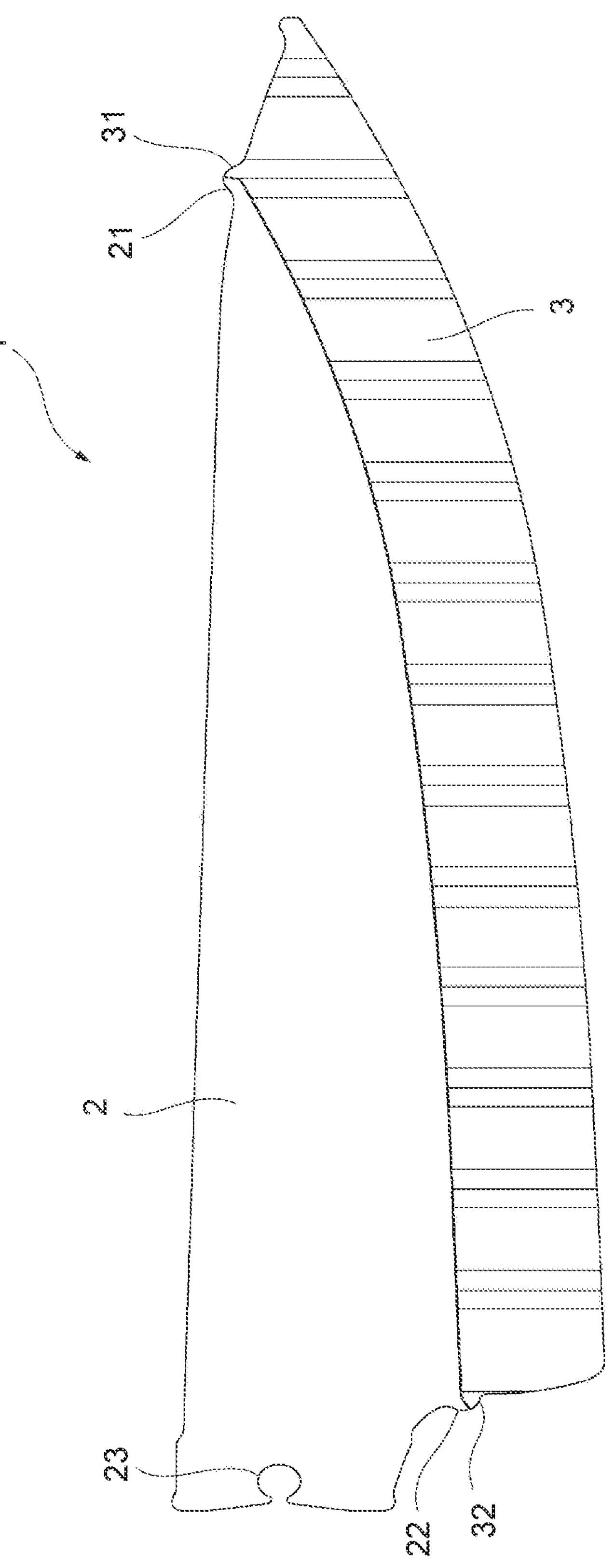
FIG. 2 is a plan view of the kitchen knife after the joining and before grinding.

The blade-side member 3 subjected to the curving process is joined to the spine-side member 2 in the joining process step S2. The joining process of joining the spine-side member 2 and the blade-side member 3 to each other is realized by performing brazing while the spine-side member 2 and the blade-side member 3 are placed on a table with respective edges aligned with each other in such a manner that the protrusions 21 and 31 and the protrusions 22 and 32 for positioning face each other, for example. The blade-side member 3 subjected to the curving process and the spine-side member 2 both have a thickness of 2.5 mm as described above, so that the blade-side member 3 and the spine-side member 2 placed on the table are at the same height. As shown in FIG. 3, during the joining process, with the spine-side member 2 and the blade-side member 3 placed on the table, the center line 3*c* of the blade-side member 3 and a center line of the spine-side member 2 overlap each other as viewed from the cutting edge side. While phosphor copper brazing alloy is used for the brazing, for example, it is not the only brazing alloy but the brazing can be performed using silver alloy, for example. As a result, the blade-side member 3 and the spine-side member 2 are joined to each other as shown in FIG. 2.

After joining between the spine-side member 2 and the blade-side member 3, the joined materials are subjected to predetermined treatment and then subjected to grinding and polishing to be finished as the kitchen knife 1. After joining between the spine-side member 2 and the blade-side member 3, the protrusions 21, 22, 31, and 32 for positioning are removed by the grinding, for example, to form a state shown in FIG. 4. In the grinding step S3, the joined spine-side member 2 and blade-side member 3 are ground from the respective front surfaces and the back surfaces to be thinned toward the cutting edge. Then, in the polishing step S4, polishing is performed at least on the blade-side member 3 in such a manner as to reduce a thickness toward the cutting edge, thereby providing a smooth surface.

Figure 5:
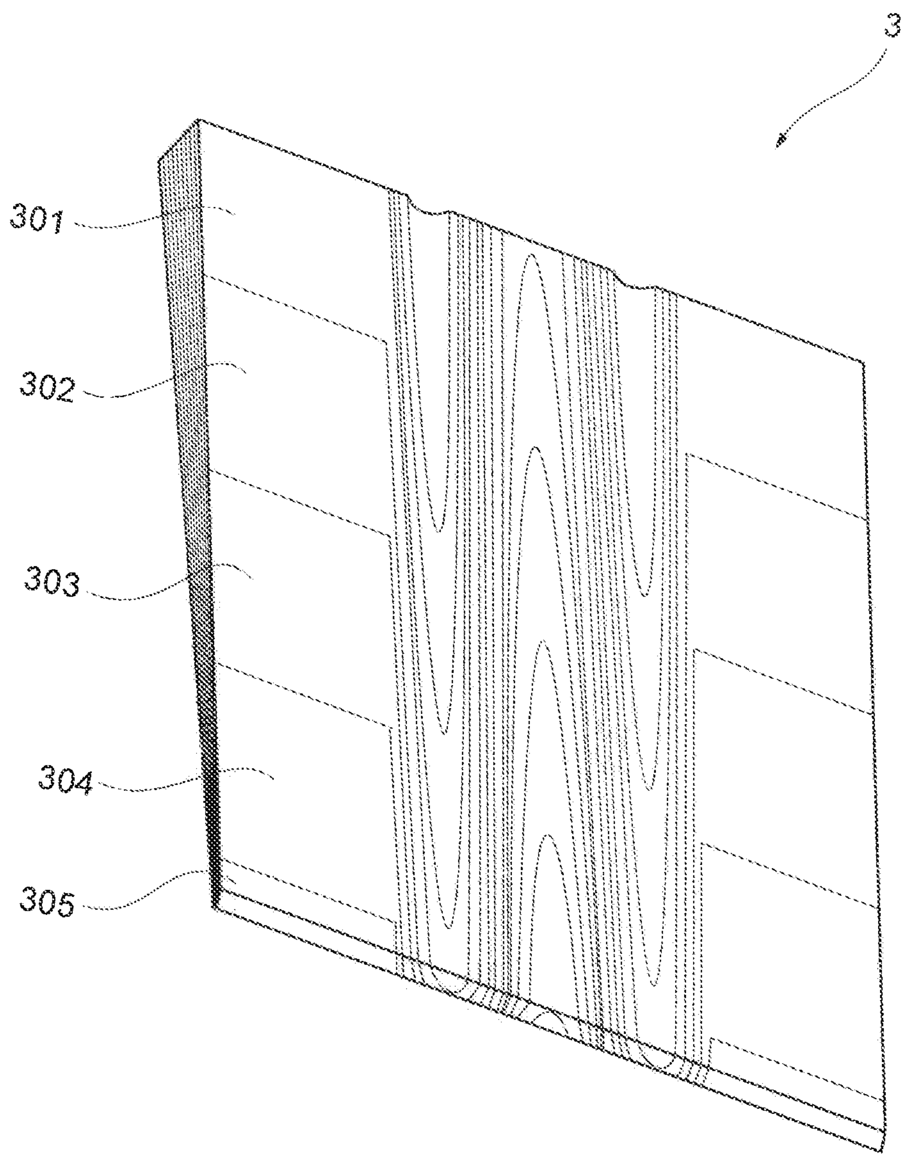
FIG. 5 is a conceptual view showing a pattern developed part of a blade-side member after the polishing in an enlarged manner.
Figure 6:
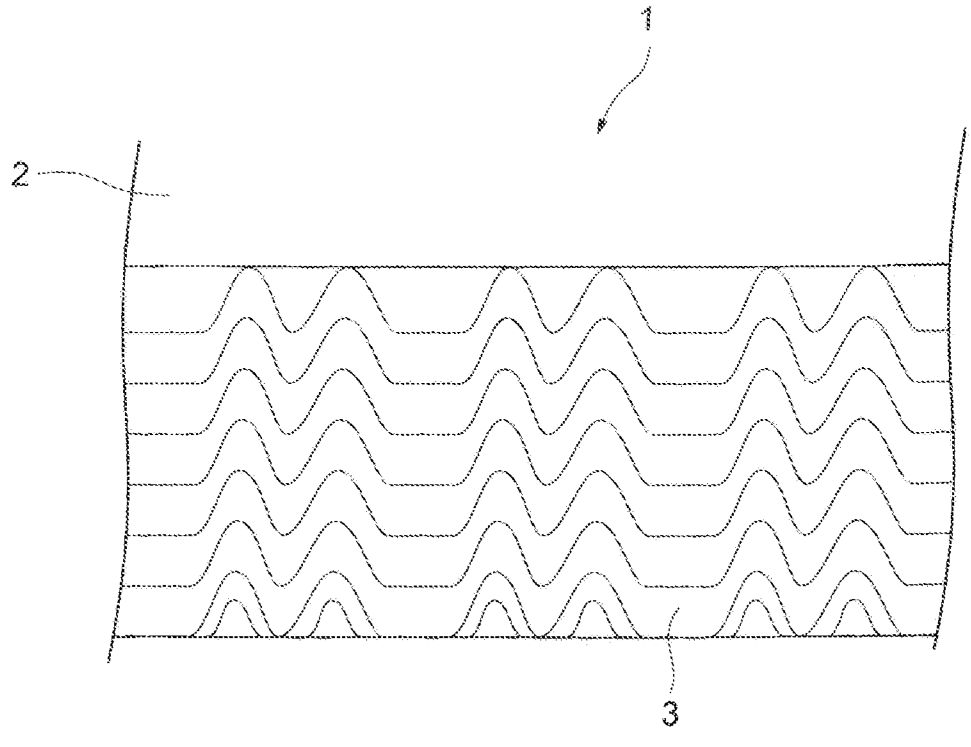
FIG. 6 is a plan view showing the pattern developed part of the blade-side member after the polishing in an enlarged manner.

At this time, in the grinding step S3 or the polishing step S4, two or more of the metallic materials in the stacked member forming the blade-side member 3 are exposed on the front surface and the back surface. As a result, a pattern such as that shown in FIGS. 4 and 6 appears on the surface of the blade-side member 3. FIG. 5 is a conceptual view showing a pattern developed part of the blade-side member 3 after the polishing in an enlarged manner. As shown in FIG. 5, on the surface of the blade-side member 3, layers 301, 302, 303, 304, and 305 of different metallic materials forming the blade-side member 3 are exposed on the front surface and the back surface of the blade-side member 3 to form a pattern. As a side shown in FIG. 5 is opposite to that in FIGS. 4 and 6, a different pattern is formed on this side. Meanwhile, at this moment, it is difficult in some cases to visually recognize a boundary between the exposed metallic materials clearly.

Next, the kitchen knife 1 after being ground and polished is subjected to the etching step S5 of performing etching process using a liquid chemical, for example. After implementation of the etching process, a level difference is defined between the metallic materials exposed on the front surface and the back surface of the blade-side member 3 as a result of a difference in solubility between the materials. This makes a boundary between the layers more recognizable to make a clear pattern appear.

Next, the buffing step S6 is conducted to perform buffing on the kitchen knife 1, particularly on the blade-side member 3 thereof. The buffing can be performed using a conventionally known method. Performing the buffing on the kitchen knife 1 makes the formed pattern more clearly recognizable. The buffing is not always required to be performed.

Then, the cutting edge of the blade-side member 3 is sharpened to become a keen edge, thereby forming a state available as a kitchen knife. The kitchen knife 1 can be provided as a kitchen knife without performing the sharpening.

Figure 4:
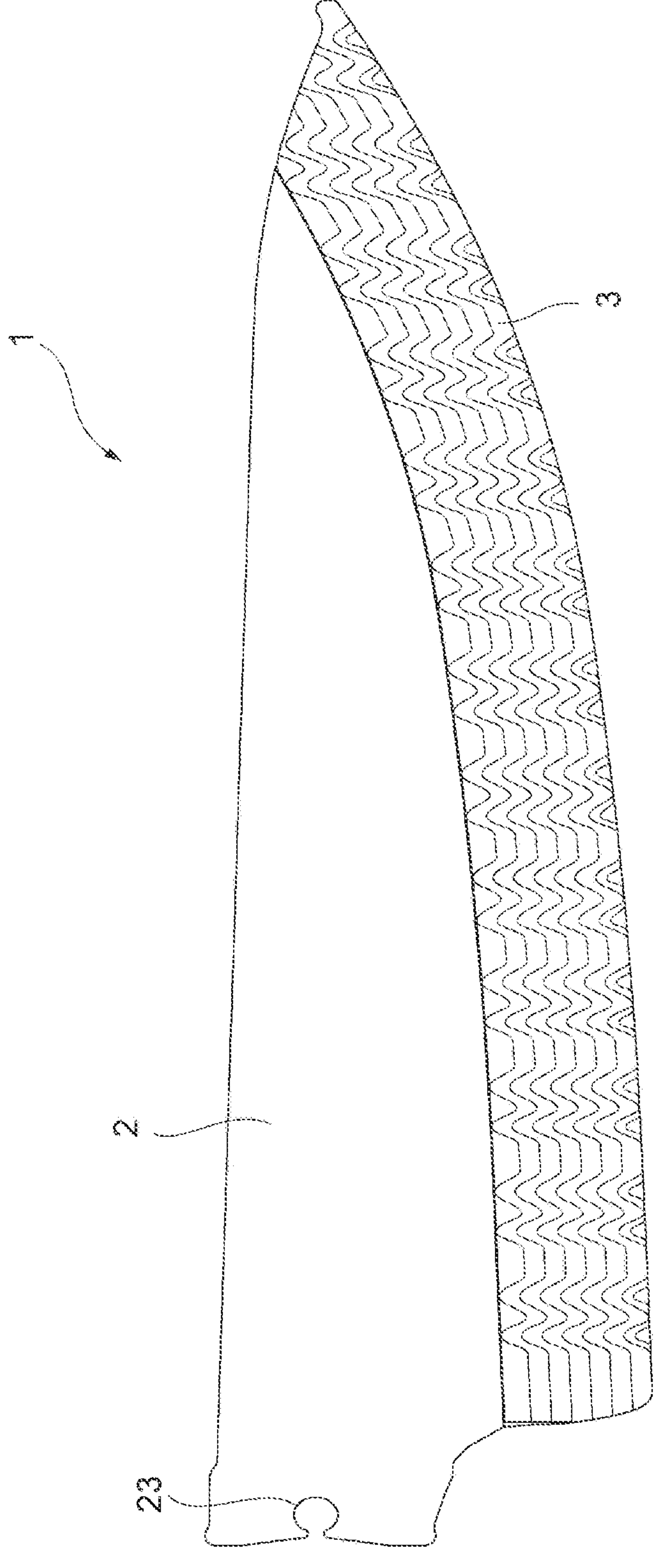
FIG. 4 is a plan view of the kitchen knife after polishing.

In this way, the kitchen knife 1 such as that shown in FIG. 4 is obtained. A handle not shown in the drawings is connected to the rear end provided with the hole part 23, thereby completing formation of the kitchen knife 1.

Modifications

The following modifications are applicable to the kitchen knife 1 and the method of manufacturing the kitchen knife 1 described in detail in the embodiment.

In the embodiment, grinding and polishing are performed on the spine-side member 2 and the blade-side member 3 after being joined to each other. Alternatively, the kitchen knife 1 may be formed by performing only one of grinding and polishing.

In the curving process step S1 of the embodiment, the blade-side member 3 is subjected to the curving process in such a manner as to be formed into the undulating shape as a whole as viewed from the cutting edge side. Alternatively, the blade-side member 3 may be processed in such a manner as to be curved only partially. Specifically, the curved part may be formed at one or more positions by the curving process. In this case, a pattern may be formed by grinding and polishing only at the curved part of the blade-side member 3.

The blade-side member 3 may be processed in such a manner that a pattern is developed only one of the front surface and the back surface.

While the blade-side member 3 of the embodiment is processed in such a manner that a developed pattern differs between the front surface and the back surface, it may be processed in such a manner that the same pattern is developed on the front surface and the back surface.

In the embodiment, a metallic material in a single layer having a shape like a flat plate is used as the spine-side member 2. Alternatively, a metallic material in a plurality of layers may be used according to purpose.

In the embodiment, while the blade-side member 3 is processed into a thickness substantially equal to that of the spine-side member 2 by the curving process, it may be processed into a different thickness. However, if the blade-side member 3 subjected to such curving process is used, trying to align the respective center lines of the blade-side member 3 and the spine-side member 2 during joining therebetween results in a failure to place the blade-side member 3 and the spine-side member 2 on the same flat table. In response to this, a step is prepared or a jig is used.

In the joining process of the embodiment, the spine-side member 2 and the blade-side member 3 are joined to each other by brazing. Alternatively, a different existing method such as laser welding, gas welding, arc welding, electron beam welding, or a different type of welding may be used for the joining therebetween, for example.

While the embodiment has been described on the assumption of using the blade-side member 3 having a uniform thickness, the blade-side member 3 to be used may be formed into a thickness reduced from the spine side toward the cutting edge side.

Characteristics of Present Embodiment

The kitchen knife 1 of the present embodiment has the following characteristics, for example.

The kitchen knife 1 comprises the spine-side member 2 and the blade-side member 3. A pattern is formed on the blade-side member 3 by processing the blade-side member 3 into a curved shape at least at a part of a stacked member thinner than the spine-side member 2 as viewed from the cutting edge side, then joining the blade-side member 3 to the spine-side member 2, and performing at least one of grinding and polishing. In this kitchen knife 1, as a metallic material in a single layer of lower unit price than the stacked member of the blade-side member 3 can be used, material cost is reduced. This allows the kitchen knife 1 to be manufactured at lower cost than a kitchen knife entirely composed of a stacked member.

The blade-side member 3 and the spine-side member 2 can be formed using different materials. This allows use of a material to provide excellent cutting ability for the blade-side member 3 and use of a material resistant to damage for the spine-side member 2, for example, so that materials suitable for respective purposes can be selected easily.

Different metallic materials appear at the cutting edge of the blade-side member 3. Thus, using metallic materials of different wear properties as the metallic materials forming respective layers in the blade-side member 3 provides a saw-like shape at the cutting edge, making it possible to achieve sharper cutting ability.

Preferably, in the kitchen knife, the blade-side member 3 is processed into an undulating shape as viewed from the cutting edge side. In this kitchen knife 1, it is possible to form a wavy pattern with an excellent aesthetic appearance on the blade-side member 3 by grinding or polishing, for example.

Preferably, in the kitchen knife 1, the different metallic materials of the blade-side member 3 are exposed on at least one of the front surface and the back surface of the blade-side member 3 by performing at least one of grinding and polishing to form the pattern on the blade-side member 3. This allows the kitchen knife 1 to become a kitchen knife with a pattern composed of different metallic materials exposed intermittently on one or both of a front surface and a back surface thereof.

Preferably, in the kitchen knife 1, while the blade-side member 3 is processed into the undulating shape, the thickness of the blade-side member 3 viewed from the cutting edge side is substantially equal to that of the spine-side member 2. By doing so, in joining between the blade-side member 3 and the spine-side member 2, it is possible to align their respective center lines by laying the blade-side member 3 and the spine-side member 2 on a flat table. This allows the blade-side member 3 and the spine-side member 2 to be joined to each other while preventing misalignment without using a dedicated jig or providing a step during the joining.

Preferably, in the kitchen knife 1, the blade-side member 3 and the spine-side member 2 are joined to each other in such a manner that the center line 3*c* of the blade-side member 3 in a thickness direction substantially overlaps a center line of the spine-side member 2 in a thickness direction. The center line 3*c* of the blade-side member 3 in the thickness direction is a line passing through a center between the line connecting the vertexes 33*a* at the front surface and the line connecting the vertexes 33*b* at the back surface of the blade-side member 3 as viewed from the cutting edge side. This achieves joining between the spine-side member 2 and the blade-side member 3 while minimizing misalignment therebetween.

Preferably, in the kitchen knife 1, etching process is performed on the blade-side member 3. By doing so, the different metallic materials forming the blade-side member 3 cause chemical changes different from each other to be altered, making it possible to form a more aesthetic pattern clearly.

A method of manufacturing the kitchen knife 1 comprises the curving process step S1, the joining process step S2, and at least one of the grinding step S3 and the polishing step S4. In the curving process step S1, the blade-side member 3 composed of a stacked member including a stack of two or more different metallic materials is processed in such a manner as to be curved at least a part thereof as viewed from a direction where a cutting edge is to be formed. In the joining process step S2, the blade-side member 3 and the spine-side member 2 are joined to each other. In the grinding step S3, at least the blade-side member 3 is ground. In the polishing step S4, at least the blade-side member 3 is polished. By manufacturing the kitchen knife 1 with the pattern formed on the blade-side member 3 through these steps, it becomes possible to manufacture a kitchen knife with a pattern at relatively low cost.

REFERENCE SIGNS LIST

1 . . . Kitchen knife
2 . . . Spine-side member
3 . . . Blade-side member
21, 22, 31, 32 . . . Protrusion

What is claimed is:

1. A method of manufacturing a kitchen knife comprising:

a curving process step of processing a blade-side member composed of a stacked member including a stack of two or more different metallic materials in such a manner as to curve the blade-side member into an undulating shape as viewed from a cutting edge side;

a joining process step of joining the blade-side member and a spine-side member to each other; and at least one of a grinding step and a polishing step of performing at least one of grinding and polishing on the joined blade-side member and spine-side member, so that the different metallic materials are exposed on at least one of a front surface and a back surface of the blade-side member to form a pattern, wherein the blade-side member before the curving process step has a smaller thickness viewed from the cutting edge side than the spine-side member, and wherein the thickness of the blade-side member viewed from the cutting edge side after the curving process step and before the at least one of a grinding step and a polishing step is equal to that of the spine-side member.

2. The method of manufacturing a kitchen knife according to claim 1, wherein in the joining process step, the blade-side member and the spine-side member are joined to each other in such a manner that a center line of the blade-side member in a thickness direction viewed from the cutting edge side overlaps a center line of the spine-side member in the thickness direction viewed from the cutting edge side.

3. The method of manufacturing a kitchen knife according to claim 2, wherein the center line of the blade-side member in the thickness direction is a straight line passing through a center between a line connecting vertexes at a front surface and a line connecting vertexes at a back surface of the blade-side member as viewed from the cutting edge side.

4. The method of manufacturing a kitchen knife according to claim 3, further comprising:

an etching process step of processing etching on the blade-side member after the at least one of a grinding step and a polishing step.

* * * * *